US000001855H

United States Statutory Invention Registration [19]

Design

Litton et al.

[11] Reg. Number: H1,855

[45] Published: Aug. 1, 2000

[54] COMPACT CASE

[75] Inventors: Garfield Litton, Glenrock, N.J.; Douglas Brian Silady, Edison, N.J.

[73] Assignee: Revlon Consumer Products Corporation, New York, N.Y.

[21] Appl. No.: 29/078,189

[22] Filed: Oct. 20, 1997

[51] LOC (7) Cl. ..... 28-03

[52] U.S. Cl. ..... D28/82; D28/82

[58] Field of Search ..... D28/76, 77; D9/341, D9/503, 504, 549, 423, 418; 132/293–307, 314; 206/235, 581, 823; 220/DIG. 26, 377

[56] References Cited

U.S. PATENT DOCUMENTS

| | | | |
|---|---|---|---|
| D. 63,504 | 12/1923 | Slater | D28/82 |
| D. 153,938 | 5/1949 | Graham | D28/77 |
| D. 245,862 | 9/1977 | Bullock et al. | D9/503 X |
| D. 277,791 | 2/1985 | Schefer | D28/82 |
| D. 373,220 | 8/1996 | Lund et al. . | |
| D. 388,549 | 12/1997 | Mouyiaris et al. | D28/82 |
| 1,103,859 | 7/1914 | Austin | 220/4.21 |
| 1,592,136 | 7/1926 | Davis . | |
| 1,599,652 | 9/1926 | Cranston . | |
| 1,959,629 | 5/1934 | Kasdan et al. . | |
| 2,033,295 | 3/1936 | Parkin . | |
| 2,141,328 | 12/1938 | Younghusband | 132/293 |
| 2,215,309 | 9/1940 | Zell . | |
| 2,421,646 | 6/1947 | Pepin . | |
| 2,449,196 | 9/1948 | Bent . | |
| 3,911,936 | 10/1975 | Kingsford . | |
| 4,454,889 | 6/1984 | Contreras, Sr. . | |
| 4,569,438 | 2/1986 | Sheffler . | |
| 4,586,519 | 5/1986 | Seidler et al. . | |
| 4,681,127 | 7/1987 | Gueret . | |
| 4,781,288 | 11/1988 | Wing . | |
| 5,135,012 | 8/1992 | Kamen et al. . | |
| 5,205,431 | 4/1993 | Zinnbauer | 206/581 X |
| 5,246,133 | 9/1993 | James | 220/377 |
| 5,669,400 | 9/1997 | Sheffler et al. | 206/581 X |
| 5,709,232 | 1/1998 | Sheffler et al. | 132/295 |

FOREIGN PATENT DOCUMENTS

| | | | |
|---|---|---|---|
| 660447 | 4/1987 | Switzerland | 132/316 |
| 451222 | 7/1936 | United Kingdom . | |

OTHER PUBLICATIONS

U.S. Application No. 29/074,712, filed Jul. 28, 1997: Compact Case, Garfield Litton.

U.S. Application No. 29/076,949, filed Sep. 19, 1997: Compact Case, Garfield Litton.

Avon C–21 1980, p. 86.

The American Boutique, Christmas 1979, p. 25: face gloss compacts, items E, F and G.

Avon, C–11 1982, p. 57—lip gloss compacts at top of page.

Drug and Cosmetic Industry 4/1984, p. 58—compact on upper left shown by arrow.

Modern Salon, 9/1987, p. 195—round compact indicated by arrow.

*Primary Examiner*—Harold J. Tudor

*Attorney, Agent, or Firm*—Julie Blackburn

[57] CLAIM

The ornamental design for a compact case, as shown and described.

DESCRIPTION

1 Claim, 2 Drawing Sheets

Figure 1:
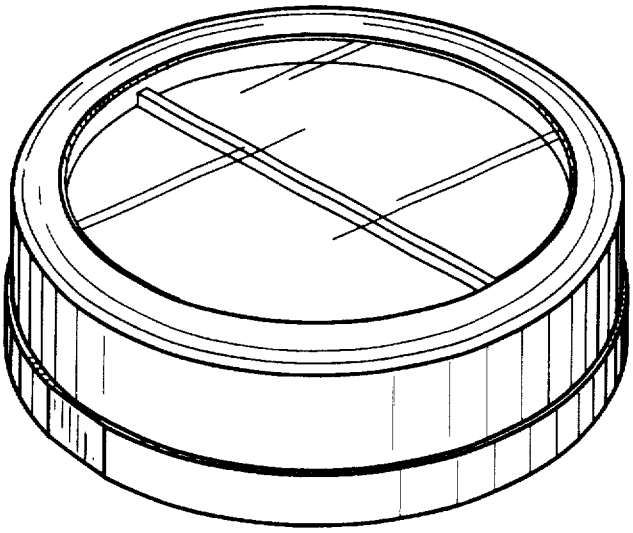
FIG. 1 is a front perspective view of the compact case.
Figure 2:
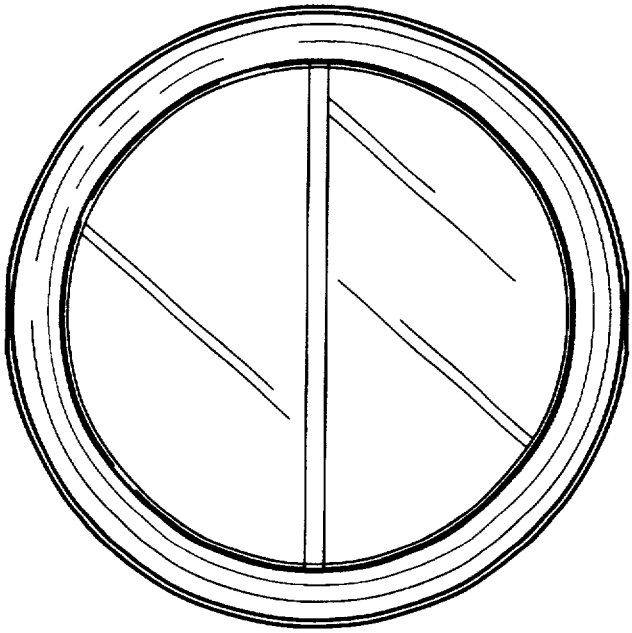
FIG. 2 is a top plan view of the compact case.
Figure 3:
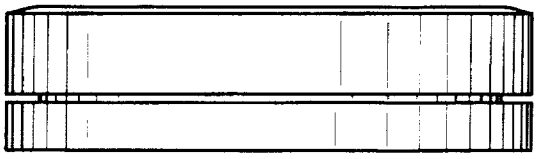
FIG. 3 is a right side elevational view of the compact case.
Figure 4:
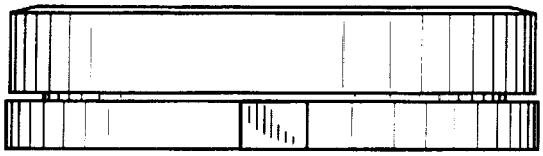
FIG. 4 is a left side elevational view of the compact case.
Figure 5:
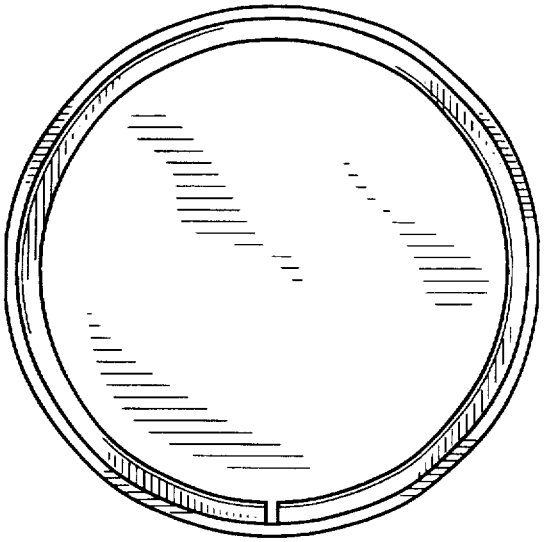
FIG. 5 is a bottom plan view of the compact case.

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.